(12) United States Patent
Raj et al.

(10) Patent No.: US 11,861,374 B2
(45) Date of Patent: Jan. 2, 2024

(54) BATCH TRANSFER OF COMMANDS AND DATA IN A SECURE COMPUTER SYSTEM

(71) Applicant: Cryptography Research, Inc., San Jose, CA (US)

(72) Inventors: Ashish Raj, Espoo (FI); Joel Wittenauer, Pleasanton, CA (US); Winthrop John Wu, Pleasanton, CA (US); Qinglai Xiao, Espoo (FI); Samatha Gummalla, Dublin, CA (US); Bryan Jason Wang, South Lake Tahoe, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

(21) Appl. No.: 18/063,984

(22) Filed: Dec. 9, 2022

(65) Prior Publication Data

US 2023/0195477 A1 Jun. 22, 2023

Related U.S. Application Data

(60) Provisional application No. 63/290,170, filed on Dec. 16, 2021.

(51) Int. Cl.
*G06F 9/445* (2018.01)
(52) U.S. Cl.
CPC .................................. *G06F 9/445* (2013.01)

(58) Field of Classification Search
CPC ....................................................... G06F 9/445
See application file for complete search history.

(56) References Cited

U.S. PATENT DOCUMENTS

| | | | | |
|---|---|---|---|---|
| 4,191,956 A | * | 3/1980 | Groothuis | H04N 7/0882 345/566 |
| 7,421,694 B2 | | 9/2008 | Gosalia et al. | |
| 11,157,626 B1 | * | 10/2021 | Ratts | H04L 67/55 |
| 2020/0344265 A1 | * | 10/2020 | Kelly | G06F 21/57 |
| 2021/0034788 A1 | | 2/2021 | Savagaonkar et al. | |
| 2022/0067221 A1 | * | 3/2022 | Schiattarella | G06F 21/602 |

\* cited by examiner

*Primary Examiner* — Hua Fan
(74) *Attorney, Agent, or Firm* — Amsel IP Law PLLC; Jason Amsel (57) ABSTRACT

A computing system includes a host device and a root of trust (RoT) device for performing batch encryption and decryption operations facilitated by a direct memory access (DMA) engine. The host device generates a command table for batch processing of a set of address tables that each describe a set of data blocks of a file to be encrypted or decrypted. The DMA engine facilitates a DMA transfer of the command table from the host memory to an RoT memory of the RoT device. The RoT device then performs batch processing of the address tables referenced in the command table. For each address table, the DMA engine copies a set of data blocks from the host memory to the RoT memory, a cryptographic engine encrypts or decrypts the data blocks, and the DMA engine copies the transformed data blocks back to the host memory.

20 Claims, 11 Drawing Sheets

| begin | open_channel(c1) | open_channel(c2) | at_batch(c1,N1) | pa(at1[0]),I1 | pa(at1[1]),J1 | ... | pa(at1[n-1]),K1 | at_batch(c2,N2) | pa(at2[0]),I2 | pa(at2[1]),J2 | ... | pa(at2[n-1]),K2 | close_channel(c1) | close_channel(c2) | end |

Command Table 820

BATCH TRANSFER OF COMMANDS AND DATA IN A SECURE COMPUTER SYSTEM

CROSS-REFERENCE TO RELATED APPLICATIONS

This application claims the benefit of U.S. Provisional Application No. 63/290,170 filed on Dec. 16, 2021, which is incorporated by reference herein.

BACKGROUND

Encrypted storage systems may be employed by local hard disks, network file servers, cloud devices, or other computing and storage devices. Utilizing encrypted storage can beneficially maintain confidentiality and integrity of files. However, encryption and decryption of files conventionally affects the bandwidth and latency associated with file storage and retrieval.

BRIEF DESCRIPTION OF THE DRAWINGS

The teachings of the embodiments herein can be readily understood by considering the following detailed description in conjunction with the accompanying drawings.

DETAILED DESCRIPTION

A computing system includes a host device and a root of trust (RoT) device for performing batch encryption and decryption operations facilitated by a direct memory access (DMA) engine. The host device generates a command table for batch processing of a set of address tables that each describe a set of data blocks of a file to be encrypted or decrypted. The DMA engine facilitates a DMA transfer of the command table from the host memory to an RoT memory of the RoT device. The RoT device performs batch processing of the address tables referenced in the command table by copying the set of address tables to a DMA memory of a DMA engine. To process each address table, the DMA engine copies set of data blocks from the host memory to the RoT memory, a cryptography engine encrypt or decrypt the data blocks, and the DMA engine copies the transformed data blocks back to the host memory. The DMA engine may further copy the address tables including authentication tags back to the host memory after encryption operations.

Figure 1:
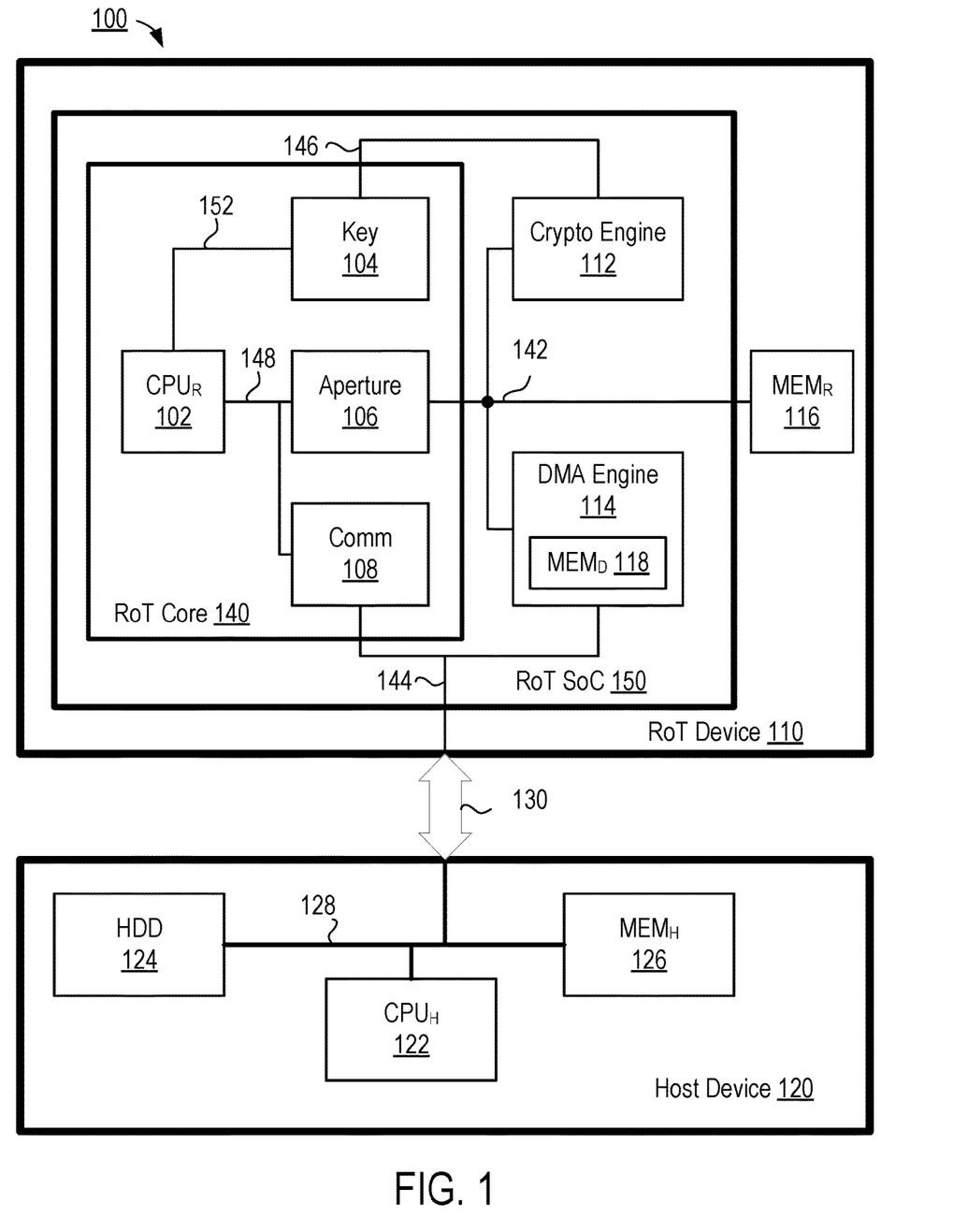
FIG. 1 is an example embodiment of a computer system that includes a root of trust (RoT) device for performing encryption and decryption operations.

FIG. 1 illustrates an example embodiment of a computing system 100 comprising a host device 120 and a root of trust (RoT) device 110 coupled by an external bus 130.

The external bus 130 may comprise, for example, a peripheral component interconnect express (PCIe) bus or other interconnect bus for transferring data and commands between the host device 120 and the RoT device 110 as described in further detail below.

The host device 120 may comprise, for example, a workstation, a server, a single-board computer, or other computing device. The host device 120 comprises at least a hard disk drive (HDD) 124, a host processor (CPUH) 122, and a host memory (MEMO) 126 coupled by a host bus 128. The host memory 126 comprises one or more dynamic random-access memory (DRAM) devices or another type of memory. The host processor 122 may comprise a general-purpose processor or a special-purpose processor (e.g., a graphics processor) for performing operations associated with data stored to the hard disk drive 124 and/or the host memory 126. Data stored by the hard disk drive 124 and the host memory 126 may be in either encrypted form (ciphertext) or decrypted form (plaintext). The host bus 128 comprises a communications pathway between the hard disk drive 124, the host processor 122, the host memory 126 and the external bus 130.

The RoT device 110 performs encryption or decryption functions associated with data stored and processed by the host device 120. For example, the RoT device 110 may receive plaintext data from the host device 120 (via the external bus 130), encrypt the plaintext data to generate ciphertext data, and provide the ciphertext data to the host device 120 via the external bus 130. Furthermore, the RoT device 110 may receive ciphertext data from the host device 120 (via the external bus 130), decrypt the ciphertext data to generate plaintext data, and provide the plaintext data back to the host device 120 via the external bus 130. In other embodiments, the RoT device 110 may perform other transformations on data from the host device 120 that are not necessarily encryption or decryption of the data. Furthermore, in some embodiments, the RoT device 110 may facilitate unidirectional transfers from the host device 120 to the RoT device 110 or vice versa without necessarily performing transformations of the data.

The RoT device 110 comprises an RoT memory ($MEM_R$) 116 and an RoT system-on-chip (SoC) 150. The RoT memory 116 may comprise one or more DRAM devices or other types of memory. The RoT SoC 150 performs encryption and decryption functions on data in the RoT memory 116. The RoT SoC 150 comprises a direct memory access (DMA) engine 114 including a DMA memory ($MEM_D$) 118, a cryptographic engine 112, and an RoT core 140 that includes an RoT processor ($CPU_R$) 102, a key module 104, an aperture 106, and a communications module 108.

The DMA engine 114 manages DMA operations of the RoT device 110 based on commands received from the RoT core 140 via an RoT system bus 142. The DMA engine 114 includes special-purpose logic for performing memory operations including direct data transfers between the host memory 126 and the DMA memory 118 or the RoT memory 116. Once initiated (e.g., via a command from the RoT processor 102), the operations of the DMA engine 114 can occur substantially independently from operations of the RoT processor 102. Thus, the RoT processor 102 can perform other processing operations in parallel with an ongoing DMA data transfer managed by the DMA engine 114. For example, to transfer data from the host memory 126 to the RoT memory 116, the DMA engine 114 reads from host memory 126 via the RoT interface bus 144 (coupled to the external bus 130) and writes to the RoT memory 116 via the RoT system bus 142. To transfer data from the RoT memory 116 to the host memory 126, the DMA engine 114 reads from the RoT memory 116 via the RoT system bus 142 and writes to the host memory 126 via the RoT interface bus 144 (coupled to the external bus 130). The DMA engine 114 may furthermore operate to transfer commands from the host device 120 to the RoT memory 116 that can be executed by the RoT processor 102 or to transfer command status information from the RoT memory 116 to the host memory 126. Upon completing a set of memory operations, the DMA engine 114 may send a signal (e.g., an interrupt) to the host processor 102 to indicate completion of the operations.

The cryptographic engine 112 performs encryption and decryption of data in the RoT memory 116 based on one or more cryptographic keys obtained from the key module 104 via the key bus 146. For example, to perform encryption, the cryptographic engine 112 obtains plaintext data from the RoT memory 116, encrypts the plaintext data to generate ciphertext data based on the one or more cryptographic keys, and writes the ciphertext back to the RoT memory 116. To perform decryption, the cryptographic engine 112 obtains ciphertext data from the RoT memory 116, decrypts the ciphertext data to generate plaintext data based on one or more cryptographic keys, and writes the plaintext data back to the RoT memory 116. The cryptographic engine 112 may operate based on instructions received from the RoT core 140 via the RoT system bus 142.

The communications module 108 facilitates communication of commands between the host device 120 (via the RoT interface bus 144 and the external bus 130) and the RoT processor 102 via the RoT internal bus 148. The interface bus 144 may include one or more interrupt lines that can be asserted from the host device 120 to cause the RoT device 140 to perform a specified action. Similarly, there may be one or more interrupt lines that can be asserted by the RoT device 110 to cause the host device 120 to perform a specified action.

The RoT processor 102 comprises a general-purpose processor or a special-purpose processor for controlling the cryptographic engine 112 and the DMA engine 114. The RoT processor 102 may furthermore interface with the key module 104 (via the RoT key bus 152) to control generation of the one or more cryptographic keys for delivery to the cryptographic engine 112. Commands may be transferred from the host device 120 to the RoT processor 102 via the communications module 108 or commands may be read by the RoT processor 102 from the RoT memory 116 via the aperture 106.

The aperture 106 comprises an isolated control plane between the RoT system bus 142 and the RoT internal bus 148 of the RoT core 140. Control commands and data communicated between the cryptographic engine 112 and the DMA engine 114 pass through the aperture 106. In an embodiment, the aperture 106 provides an interface between separate address spaces of the RoT core 140 and external components such as the cryptography engine 112 and the DMA engine 114. In alternative embodiments, the cryptography engine 112 and the DMA engine 114 may be in the same address space as the RoT core 140 and the aperture 106 may be omitted.

The key module 104 generates and delivers cryptographic keys applied by the cryptographic engine 112 in encryption and decryption operations. For example, in one implementation, a cryptographic key may be generated by the key module 104, sent to the RoT processor 102 for further processing, and then delivered to the cryptographic engine 112 via the key module 104. Alternatively, the key module 104 may operate only to deliver keys without necessarily generating them.

In an example embodiment, the RoT device 110 may comprise a printed circuit board that supports the RoT memory 116 and the RoT SoC 150. The RoT SoC 150 may be implemented using a field programmable gate array (FPGA) or may comprise an application-specific integrated circuit (ASIC) device. In another embodiment, the DMA engine 114 may be implemented as a standalone integrated circuit separate from the RoT core 140 and the cryptography engine 112. In other embodiments, one or more components of the RoT SoC 150 may be implemented in software or firmware. For example, functions of the RoT SoC 150 described herein may be implemented based on the RoT processor 102 executing instructions stored to a non-transitory computer-readable storage medium.

Figure 2:
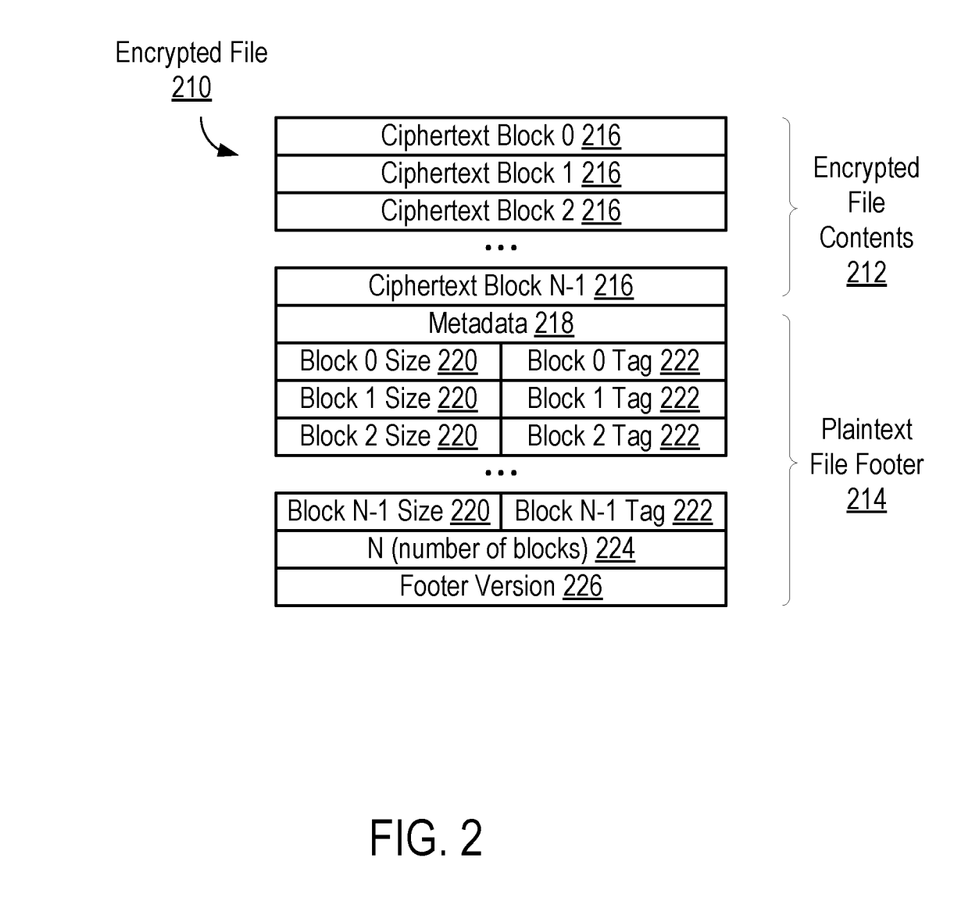
FIG. 2 is an example embodiment of a data structure for an encrypted file.
Figure 3:
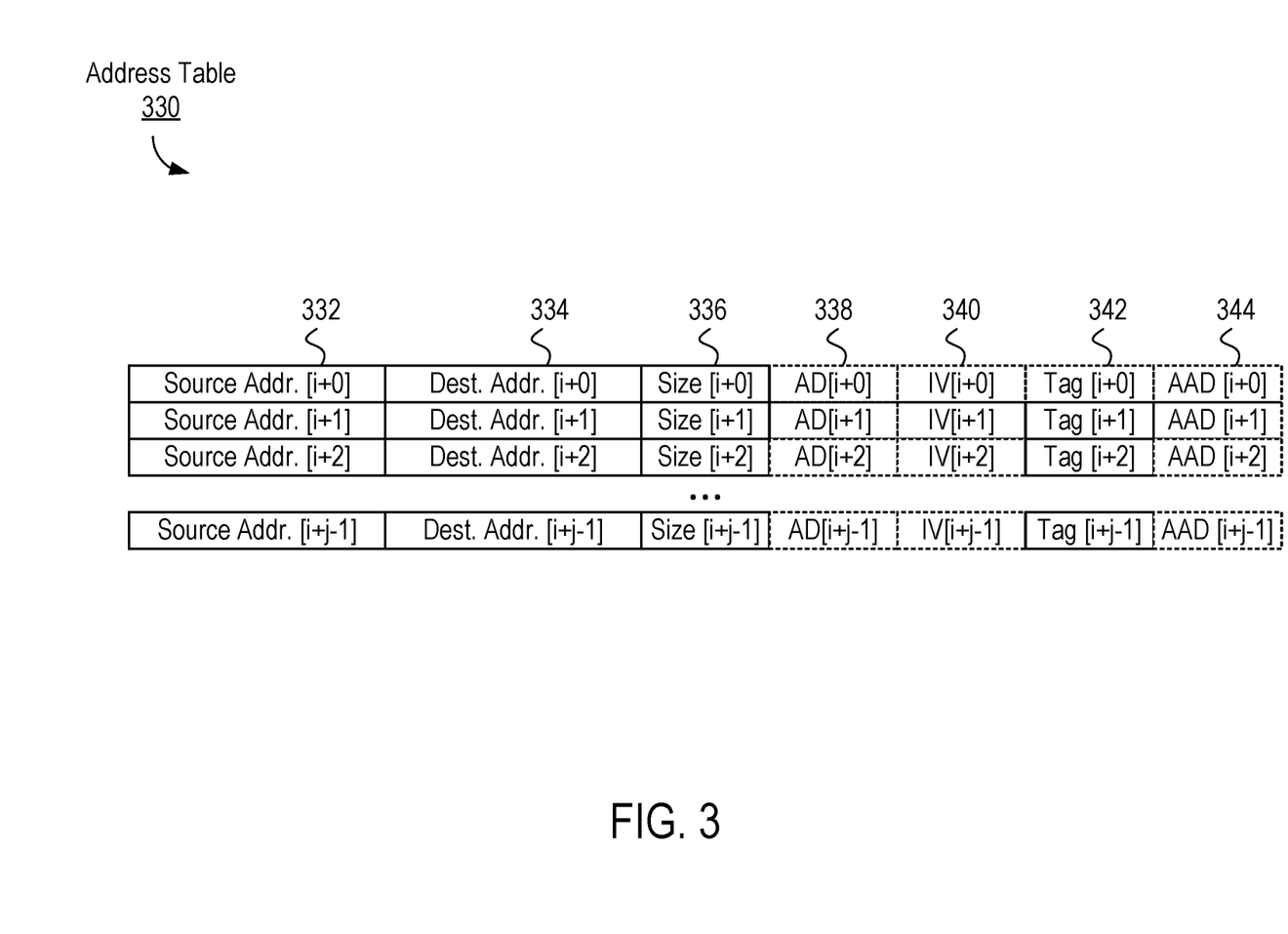
FIG. 3 is an example embodiment of a data structure for an address table.

FIG. 2 illustrates an example embodiment of a structure for an encrypted file 210. The encrypted file 210 includes encrypted file contents 212 comprising a set of ciphertext blocks 216 (e.g., N blocks) and a plaintext file footer 214. The ciphertext blocks 216 may be of varying size and different encrypted files 210 may have different numbers N of ciphertext blocks 216. The plaintext file footer 214 may include various footer data that provides information relevant to encryption and decryption operations such as, for example, a metadata field 218, block size fields 220, block tag fields 222, a total size field 224, and a footer version field 226. The block size fields 220 specify block sizes for the respective ciphertext blocks 216. In an embodiment, each ciphertext block 216 has a size that is a multiple of a typical page size (e.g., 4 KB). The block tag fields 222 comprise authenticated encryption tags for each respective ciphertext block 216 that may be used to verify the integrity of the corresponding ciphertext block 216. The metadata field 218 may include various information utilized during decryption of the ciphertext blocks 216 to derive the cryptographic key. The footer version field 226 provides a file format version associated with the plaintext file footer 214. FIG. 3 illustrates an example of an address table 330 associated with the encrypted file 210 or a portion thereof. The address table 330 comprises a set of pointers to logical blocks and metadata associated with each block. The metadata can apply to one or more entries in the address table 330 or each entry could have different metadata, thus allowing the address table to support multiple contexts for the blocks associated with the address table 330. The address table 330 enables the DMA engine 114 to perform scatter-gather functions associated with data blocks transferred into and out of the host memory 126. For example, the ciphertext blocks 216 of an encrypted file 210 may be stored in the host memory 126 in a scattered manner such that the physical addresses of each ciphertext block 216 are non-contiguous. Similarly, upon decrypting the encrypted file 210, the resulting plaintext blocks may be scattered in the host memory 126 across non-contiguous addresses.

In the illustrated example, the address table 330 provides information used during decryption to locate the ciphertext blocks 216 in the host memory 126, derive the relevant cryptographic information for performing decryption, and control where the resulting plaintext blocks are written to in the host memory 126. In an embodiment, the address table 330 comprises a set of rows that each correspond to a different ciphertext block 216 of the encrypted file 210. Each row specifies at least a source address 332 for the corresponding ciphertext block 216 that indicates where the ciphertext block 216 is stored in the host memory 126, a destination address 334 for a corresponding plaintext block that indicates where to store the plaintext block in the host memory 126 after decryption, and a size field 336 indicating a size of the ciphertext block 216 (which may be copied directly from the block size fields 220 of the plaintext file footer 214). Optionally, each row of the address table 330 may further include additional fields that may be utilized during decryption such as, for example, an initialization vector 340, block tag 342 (which may be copied directly from the block tag field 222 of the plaintext file footer 214), and additional authentication data 344. The AD field 338 comprises a flag indicating whether or not the optional fields 340, 342, 344 are valid. For example, the AD field 338 is set to valid when the address table 330 is used for encryption and decryption operations and is set to invalid when used for unidirectional transfer operations where these additional fields 340, 342, 344 are not utilized.

An address table 330 does not necessarily describe an entire encrypted file 210 and may instead describe only a subset of the ciphertext blocks 216 of an encrypted file 210. Thus, multiple address tables 330 may be employed to collectively describe a single encrypted file 210. For example, in the illustrated embodiment, the address table 330 comprises j rows beginning with the ith data block of the file. The size of each address table 330 employed to describe an encrypted file 210 may be limited by the size of the DMA memory 118 of the DMA engine 114. For example, if the DMA memory is limited to 4096 bytes (4 KB) and each row of the address table 330 comprises 52 bytes, then each address table 330 can have up to 78 rows. An encrypted file 210 that is 1 GB in size and has 4 KB ciphertext blocks would therefore take up 262,144 address table rows, which may be split across 3,361 different address tables 330.

While the above description describes the address table 330 of FIG. 3 as corresponding to an encrypted file 210 or a portion thereof, a similar address table 330 may be constructed for a plaintext file or a portion thereof. In this case, each row of the address table 330 corresponds to a plaintext block, the source address 332 indicates a location of the corresponding plaintext block in the host memory 126, the destination address 334 indicates where to store the ciphertext block in the host memory 126 after encryption, and the size field 336 indicates a size of the plaintext block. The additional optional fields of the address table 330 for a plaintext block (e.g., fields 338, 340, 342, 344) may provide various information associated with the block pointed to be the source address 332. For example, the AD flag 338 operates as described above to indicate whether remaining fields are valid, the tag field 342 is an authentication tag generated during encryption, and the initialization vector field 340 and additional authentication data field 344 are utilized during encryption.

While the address table 330 provides one example format, other formats may be utilized in different embodiments that may include different, additional, or fewer fields.

Figure 4:
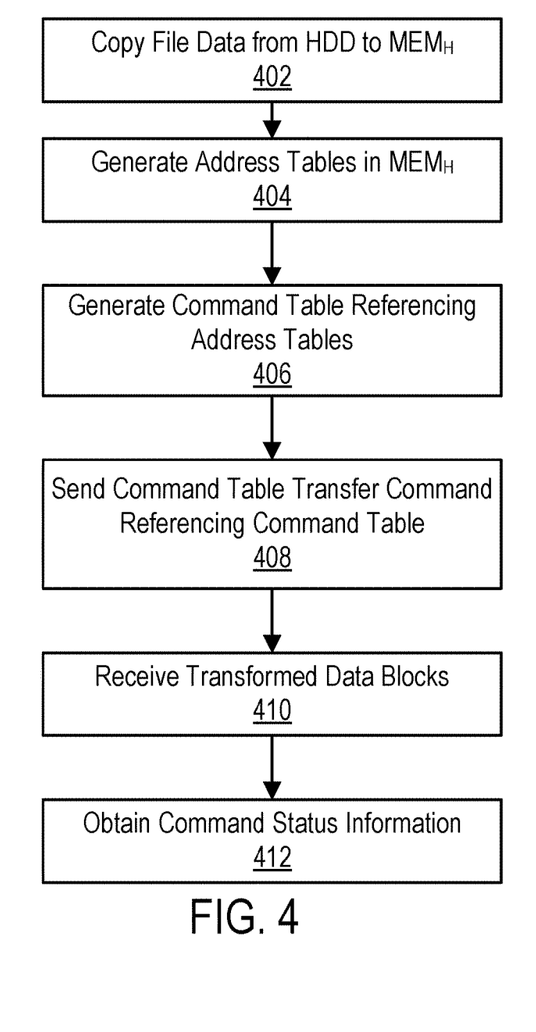
FIG. 4 is a flowchart illustrating an example embodiment of a process performed by a host device for encrypting or decrypting files.

FIG. 4 illustrates an example embodiment of a process performed by the host device 120 in association with initiating a transformation (e.g., encryption or decryption) of a file or portion thereof. The host processor 122 copies 402 file data for a file (e.g., a set of data blocks which may be ciphertext blocks or plaintext blocks) from the hard disk drive 124 to the host memory 126. The host processor 122 generates 404 a set of one or more address tables associated with the file. As described above, each of the address tables includes a set of rows corresponding to different blocks of the file. Each row includes a source address referencing an address of the block in the host memory 126, a destination address referencing an address in the host memory 126 for receiving the corresponding transformed block after encryption or decryption, and various data fields for facilitating the transformation of the block. The host processor 122 then generates 406 a command table in the host memory 126 that comprises a set of commands for performing a batch processing of the address tables. The host processor 122 sends 408 a command table transfer signal to the RoT device 110 to initiate transfer of the command table in the host memory 126 to the RoT device 110. In an embodiment, the command table transfer signal comprises an interrupt signal asserted on the external bus 130 that is detectable by the communications module 108 of the RoT device 110. Following the encryption or decryption operations performed by the RoT device 110, the host device 120 receives 410 the transformed blocks from the RoT device 110 into the host memory 126 via a DMA transfer. The transformed blocks are stored to the respective destination addresses specified in the address tables. After completion of the command table, the host device 120 may also receive 412 command status information for each of the commands in the command table that indicates whether each command succeeded or failed.

In an embodiment, the host device 120 stores each address table 330 in the host memory 126 starting at a memory page boundary such that some number of the least-significant bits of the address of the address table 330 are zero. In this case, the one or more of the least significant bits of the address of the address table may instead be used to encode the number of rows in the address table.

Figure 5:
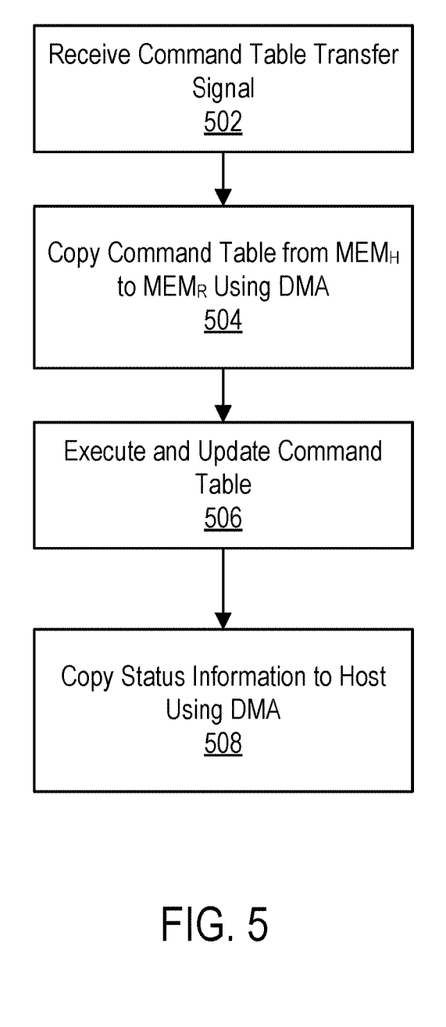
FIG. 5 is a flowchart illustrating an example embodiment of a process performed by a RoT device for encrypting or decrypting files.

FIG. 5 illustrates an example embodiment of a process performed by the RoT device 110 in association with a transformation (e.g., encryption or decryption) of a file or portion thereof. The RoT device 110 receives 502 the command table transfer signal from the host device 120 (e.g., via an interrupt signal) 6. In response to the command table transfer signal, the RoT processor 102 causes the DMA engine 114 to copy 504 the command table from the host memory 126 to the RoT memory 116 via a DMA transfer. The RoT processor 102 then executes 506 the commands in the command table. When executing the commands, the DMA engine 114 obtains the data blocks from the host memory 126, the cryptography engine 112 transforms the data blocks (e.g., perform encryption or decryption), and the DMA engine 114 writes the resulting transformed data blocks back to the host memory 126, as described in further detail below with to FIG. 6. The RoT processor 102 may furthermore write a status result indicating a success or failure of each command to respective status fields for the commands in the command table. Upon reaching the end of the command table, the RoT processor 102 causes the DMA engine 114 to copy 508 the status information associated with the command table to the host device 120 via a DMA transfer. The RoT processor 102 may then generate a completion signal as an interrupt signal on the external bus 130 detectable by the host device 120 to indicate completion of the operation.

Figure 6:
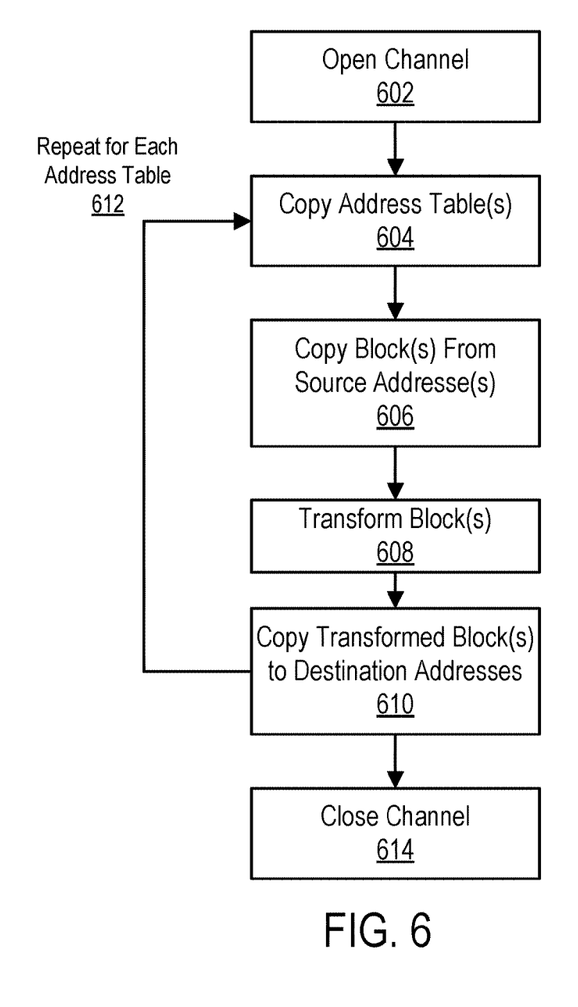
FIG. 6 is a flowchart illustrating an example embodiment of a process performed by a RoT device for batch processing of address tables during encryption and decryption operations.

FIG. 6 illustrates an example embodiment of a process performed by the RoT device 110 for executing the command table to facilitate encryption or decryption operations. In this embodiment, the sequence of commands in the command table includes an "open channel" command, a set of batch transformation processing commands, and a "close channel" command. The RoT processor 102 executes the open channel command to open 602 a channel supported by the cryptography engine 112. This step may include generating a cryptographic key and delivering the cryptographic key to the cryptographic engine 112. The RoT processor 102 causes the DMA engine 114 to copy 604 one or more address tables referenced in the command table from the host memory 126 to the DMA memory 118. The RoT processor 102 then causes the DMA engine 114 to execute a sequence of batch address table commands that each reference the starting address of the address table and the number of rows in the address table. Here, when executing an address table command, the DMA engine 114 copies 606 the data blocks referenced in the source address fields of the address table from the host memory 126 to the RoT memory 116. The cryptographic engine 112 transforms 608 (e.g., encrypts or decrypts) the data blocks in the RoT memory 116. For example, in a decryption operation, the cryptographic engine 112 obtains a ciphertext block from the RoT memory 116, decrypts the block, and writes corresponding plaintext back to the RoT memory 116. In an encryption operation, the cryptographic engine 112 obtains a plaintext block from the RoT memory 116, encrypts the block, and writes corresponding ciphertext back to the RoT memory 116. The encryption or decryption operations may be based in part on the cryptographic information stored to the address table. The DMA engine copies 610 the transformed blocks to the corresponding destination addresses referenced in the address table. The RoT processor 102 may furthermore update status information associated with each command in the command table as it is processed to indicate success or failure of the command.

In an embodiment, while the cryptography engine 112 is processing a row of an address table, the DMA engine 114 may begin copying data associated with the next row of the address table. Furthermore, once processing of an address table is initiated, the DMA engine 114 and cryptography engine 112 may operate substantially independently of the RoT processor 102 such that the RoT processor 102 may concurrently perform other operations.

After processing an individual address table, the DMA engine 114 may signal to the RoT processor 102 that it has completed processing of the address table, after which steps 604-610 may repeat for the next address table. For example, the RoT processor 102 may provide information about the next address table to the DMA engine 114 or indicates that all address tables have been processed. Following processing of all address tables, the RoT processor 102 executes a "close channel" command to close 612 the channel. The RoT processor 102 also copies the status information associated with the command table back to the host memory 126 via a DMA transfer and may then assert the completion signal as an interrupt to the host device 120 via the communication module 108.

In an embodiment, the RoT processor 102 may perform authentication of the data blocks referenced in the address tables prior to processing them. For example, the RoT processor 102 may verify the integrity of the data blocks based on the block tags 342 and/or additional authentication data 344.

In an embodiment, transferring of the command table from the host memory 126 to the RoT memory 116 may be implemented using an address table that references the command table. Here, the host device 120 generates the address table in the host memory 126 and sends the address of the address table and its size to the RoT device 110 via the communication module 108 during an initialization process. Then, when the host device 120 sends the command table transfer signal as an interrupt, the DMA engine 114 is configured to transfer the address table to the DMA memory 118, and process the address table to copy the command table to the RoT memory 116.

Figure 7:
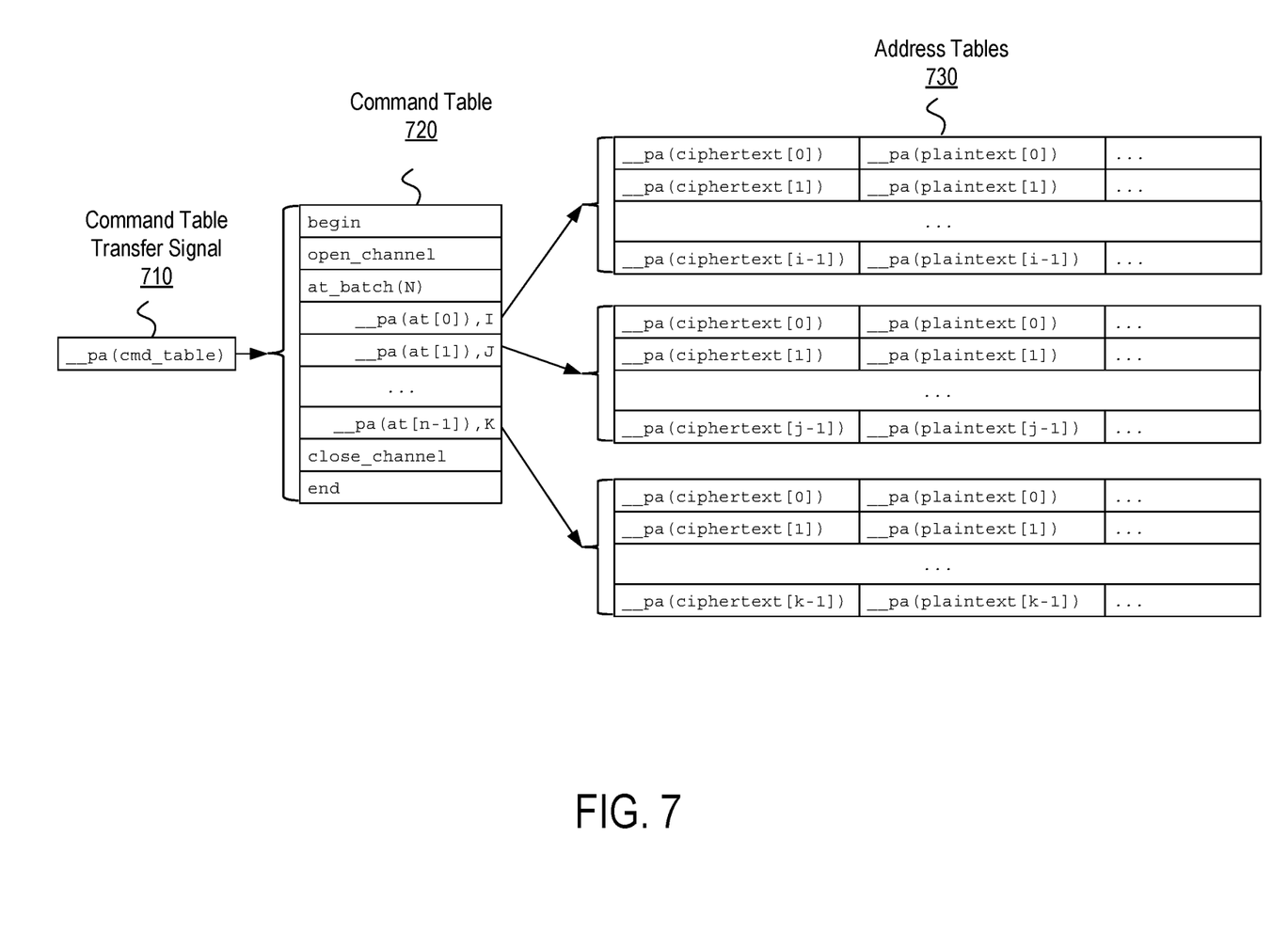
FIG. 7 is an example embodiment of a set of data structures utilized by an RoT device during encryption and decryption operations.

FIG. 7 illustrates an example of a set of data structures for a command transfer signal 710, a command table 720, and a set of address tables 730. The command transfer signal 710 may comprise a single command that references the location of an address table that references the command table 720 in the host memory 126. As described above, the command table 720 begins with a command for opening a channel, includes a set of commands for batch processing of respective address tables, and ends with a command for closing the channel. The address table commands each reference the location of the corresponding address table 730 in the host memory 126 as described above. In this example, the address blocks 730 relate to an encrypted file for decryption by the RoT device 110. As described above, a similar structure may be used to facilitate encryption except that the source address fields in the address tables 730 reference plaintext blocks and the destination address field in the address tables 730 specify where the ciphertext blocks will be written. Furthermore, similar data structures may be used for implementing a unidirectional data transfer (without necessarily performing encryption or decryption). In this case, the source addresses in the address tables 730 may reference an address in the host memory 126 and the destination addresses may reference an address in the RoT memory 116 or vice versa.

Figure 8:
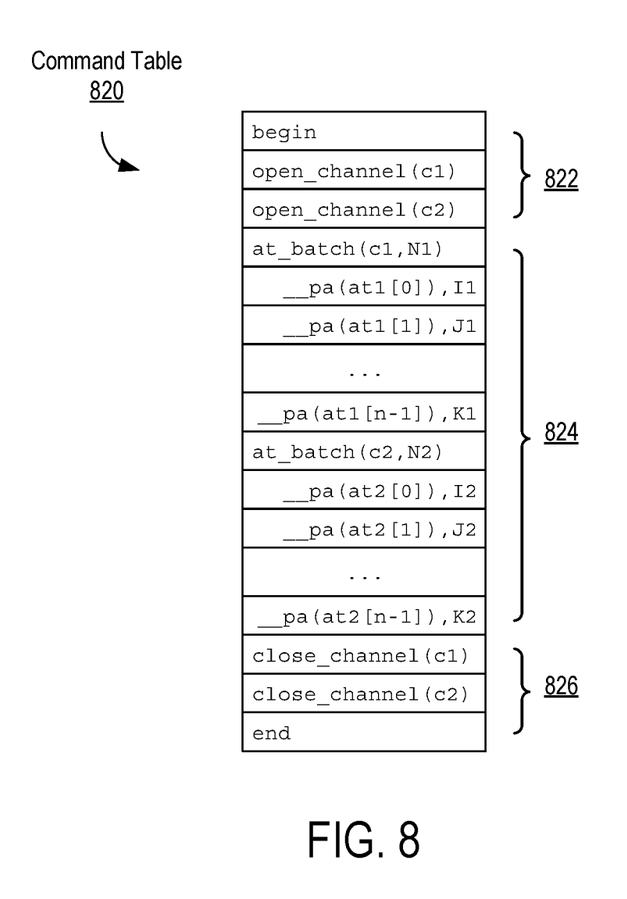
FIG. 8 is an example embodiment of a command table for concurrently processing multiple encryption or decryption command streams.

FIG. 8 illustrates another example of a command table 820. In this embodiment, the command table 820 facilitates transfers of two different DMA streams concurrently (e.g., corresponding to different files or different portions of a file). Here, the command table 820 includes commands 822 for opening both a first and second channel, commands 824 for performing batch processing of the address tables associated with the respective channels, and commands 826 for closing the first and second channels. In other embodiments, the command table 820 may facilitate concurrent transfer of data streams over more than two channels.

Figure 9:
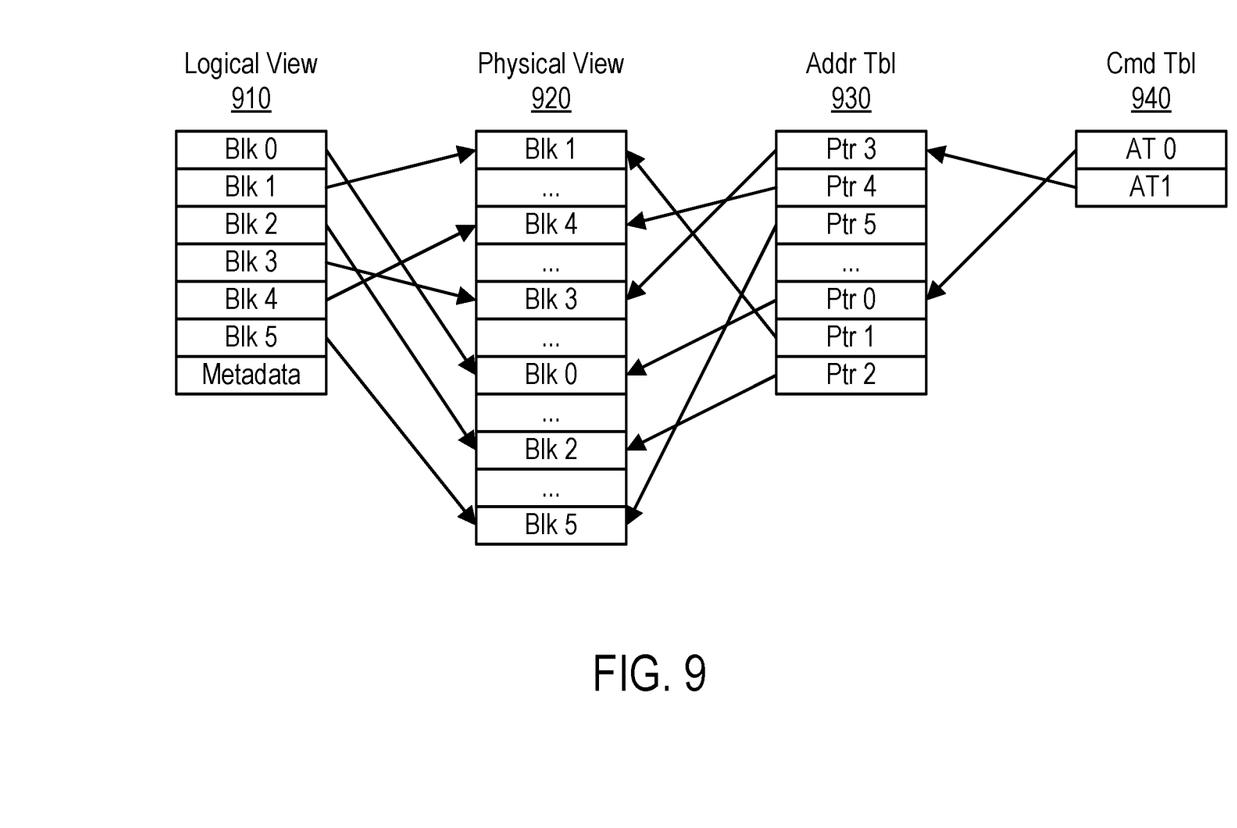
FIG. 9 is a block diagram illustrating examples of data structures at various processing stages.

FIG. 9 illustrates examples of various data structures associated with the above-described operations. Here, the logical view 910 represents the logical organization of a file as a collection of data blocks and associated metadata. The logical view 910 may be consistent with the format of the file at rest in long-term storage (e.g., in the HDD 124). The physical view 920 indicates an example structure for how the file may be organized when it is loaded into the host memory 126. Here, the data blocks are assigned to memory locations that are not necessarily contiguous or consecutive. The address tables 930 comprise a set of pointers to the data blocks in the memory 126. In the illustrated example, the file is described by two address tables that each reference a subset of the data blocks. Here, the address tables and their respective sets of pointers are also not necessarily stored in the same order as the data blocks that they reference but may be scattered in memory. The command table 940 groups the set of address tables into a single structure comprising pointers to the respective address tables.

Figure 10:
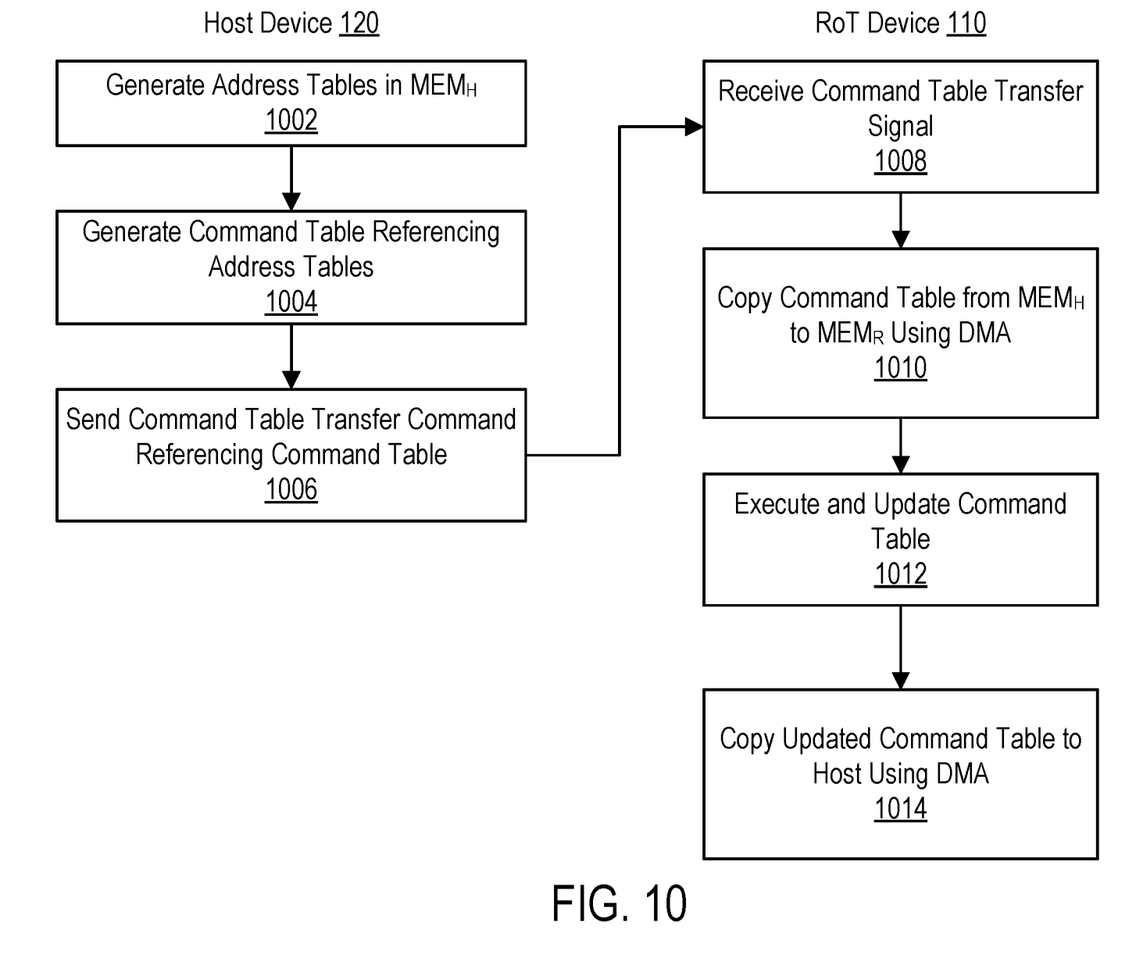
FIG. 10 is a flowchart illustrating an example embodiment of a process for implementing a unidirectional transfer of data blocks using batch command processing.

FIG. 10 illustrates an example embodiment of a process for facilitating a unidirectional transfer of data (e.g., from the host memory 126 to the RoT memory 116 or vice versa) without necessarily performing any encryption, decryption, or other transformation. In this process, the host processor 122 generates 1002 a set of address tables in the host memory 126 identifying the source or destination addresses for the data blocks being transferred depending on the direction of transfer. Furthermore, in this embodiment, the address tables may lack the metadata fields providing encryption/decryption parameters. The host processor 122 generates 1004 a command table that references the address tables and sends 1006 a command table transfer signal referencing the command table to the RoT device 110 as described above. The RoT device 110 receives 1008 the command table transfer signal and copies 1010 the command table from the host memory 126 to the RoT memory 116 via a DMA transfer as described above. The RoT device 110 then executes 1012 the commands to cause the DMA engine 114 to perform the data transfers specified in the address tables. The RoT device 110 may furthermore update status information of the commands in the command table and cause the DMA engine 114 to copy 1014 the command table including the status information associated with the commands from the RoT memory 116 to the host memory 126 as described above.

Figure 11:
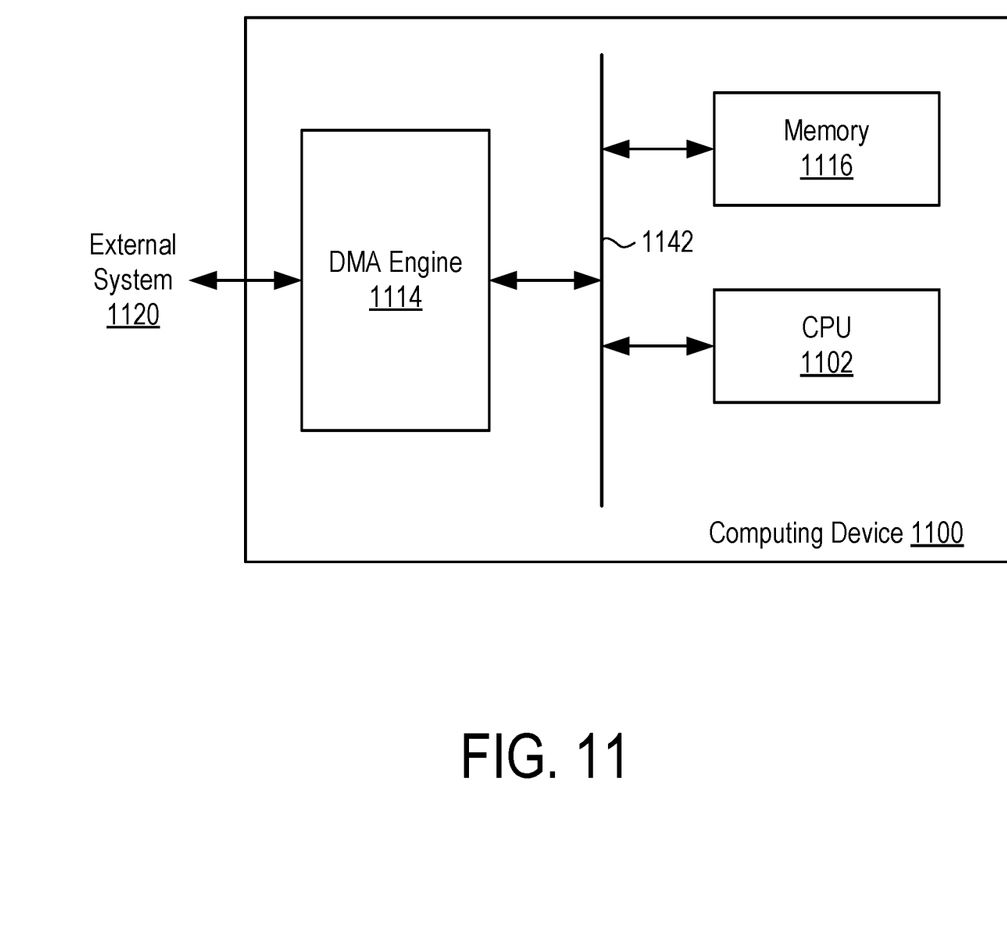
FIG. 11 is an example embodiment of a computing device including a direct memory access (DMA) engine.

FIG. 11 illustrates another example embodiment of a computing device 1100 that incorporates a DMA engine 1114. The computing device 1100 comprises the DMA engine 1114, a memory 1116, and a processor 1102, all coupled by a bus 1142.

The processor 1102 may comprise a general-purpose processor or a special-purpose processor specifically configured for graphics processing, security function processing, cryptographic processing, or other special-purpose computer functions. The memory 1116 may comprise one or more DRAM devices or other types of general or special-purpose memory.

The DMA engine 1114 manages DMA operations of the computing device 1100 based on commands received from the processor 1102 to transfer data to the memory 1116 (or an internal memory of the DMA engine 1114) from an external system 1120 and to transfer data from the memory 1116 (or an internal memory of the DMA engine 1114) to the external system 1120. The processor 1102 and DMA engine 1114 may operate to facilitate DMA transfers according to any of the embodiments described above. For example, the external system 1120 may operate according to the flowchart of FIG. 4 to generate address tables associated with data for transferring, generate a command table referencing the address tables, and send the command table to the computing device 1100. The processor 1102 and DMA engine 1114 of the computing system 1100 then operate according to the embodiments of FIG. 5 (and optionally FIG. 6) to process the command table. For example, the processor 1102 executes a sequence of commands in the command table, where each command references an address table and causes the DMA engine 1114 to transfer the data referenced in the address table. Alternatively, the processor 1102 and DMA engine 1114 may operate in a similar manner to transfer data from the memory 1116 to the external system 1120 or between different memory locations within the memory 1116. The external system 1120 and computing device 1100 may also operate according to the process of FIG. 10 to perform unidirectional transfers without necessarily performing any transformation of the data.

In the example computing device 1100, the DMA engine 1114 includes logic performing memory operations independently of the processor 1102 once initiated. For example, the processor 1102 may send a command to the DMA engine 1114 to initiate a DMA transfer associated with an address table, after which the DMA engine 1114 independently executes the transfer while the processor 1102 may perform other operations in parallel. Upon completing the transfer, the DMA engine 1114 may assert a signal to indicate to the processor 1102 that the operations are completed, which causes the processor 1102 to proceed to the next command in the command table.

The DMA engine 1114 may be embodied in one or more standalone integrated circuits or chips such as an application specific integrated circuit (ASIC) or field programmable gate array (FPGA). Furthermore, the DMA engine 1114 may be incorporated into one or more integrated circuits or chips that include other components (such as those illustrated in FIG. 11) for performing general purpose computing functions, or special purpose functions such as graphics processing, security (e.g., encryption, decryption, or other cryptographic functions), or other specialized computing functions.

Upon reading this disclosure, those of ordinary skill in the art will appreciate still alternative structural and functional designs and processes for the described embodiments, through the disclosed principles of the present disclosure. Thus, while embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A method performed by a root of trust (RoT) device, the method comprising:
   receiving, from a host memory of a host device, a command table transfer signal;
   responsive to the command table transfer signal, causing a direct memory access (DMA) engine of the RoT device to transfer a command table from the host memory to an RoT memory of the RoT device, the command table comprising a sequence of commands for batch execution;
   executing the sequence of commands in the command table, wherein executing each command comprises:
      causing the DMA engine to copy an address table from the host memory to a DMA memory of the DMA engine, the address table identifying source addresses for input data blocks and destination addresses for output data blocks;
      causing the DMA engine to copy the input data blocks identified by the source addresses in the address table from the host memory to the RoT memory;
      processing the input data blocks by the RoT device to encrypt or decrypt the input data blocks to generate the output data blocks in the RoT memory;
      causing the DMA engine to copy the output data blocks from the RoT memory to the destination addresses in the host memory; and updating status information associated with the command table in the RoT memory to generate an updated command table; and following execution of the sequence of commands, causing the DMA engine to copy the status information to the host memory of the host device.

2. The method of claim 1, wherein the sequence of commands in the command table comprises at least a first sequence of commands associated with a first data stream of a first file and a second sequence of commands associated with a second data stream of a second file, and wherein executing the sequence of commands comprises processing the first data stream and the second data stream in parallel.

3. The method of claim 1, wherein processing the input data blocks further comprises:

authenticating the input data blocks based on authentication information in the address table.

4. The method of claim 1, wherein the input data blocks comprise ciphertext blocks, wherein the output data blocks comprise plaintext blocks, and wherein processing the input data blocks comprises decrypting the ciphertext blocks to generate the plaintext blocks.

5. The method of claim 1, wherein the input data blocks comprise plaintext blocks, wherein the output data blocks comprise ciphertext blocks, and wherein processing the input data blocks comprises encrypting the plaintext blocks to generate the ciphertext blocks.

6. The method of claim 1, wherein the command table transfer signal comprises an interrupt signal generated by the host device and detected by the RoT device.

7. The method of claim 1, further comprising:

asserting an interrupt signal detectable by the host device that signals when the DMA engine completes copying the updated command table to the host memory of the host device.

8. The method of claim 1, wherein the DMA engine performs scatter-gather functions to copy the input data blocks from non-contiguous memory locations in the host memory and to copy the output data blocks to non-contiguous memory locations in the host memory.

9. A root of trust (RoT) device, comprising:
an RoT memory;
a cryptography engine;
a direct memory access (DMA) engine; and
an RoT processor to perform steps comprising:
receiving from a host memory of a host device, a command table transfer signal;
responsive to the command table transfer signal, causing the DMA engine to transfer a command table from the host memory to the RoT memory, the command table comprising a sequence of commands for batch execution;
executing the sequence of commands in the command table, wherein executing each command comprises:
causing the DMA engine to copy an address table from the host memory to a DMA memory of the DMA engine, the address table identifying source addresses for input data blocks and destination addresses for output data blocks;
causing the DMA engine to copy the input data blocks identified by the source addresses in the address table from the host memory to the RoT memory;
causing the cryptography engine to encrypt or decrypt the input data blocks to generate the output data blocks in the RoT memory;

causing the DMA engine to copy the output data blocks from the RoT memory to the destination addresses in the host memory; and
updating status information associated with the command table in the RoT memory to generate an updated command table; and
following execution of the sequence of commands, causing the DMA engine to copy the status information to the host memory of the host device.

10. The RoT device of claim 9, wherein the sequence of commands in the command table comprises at least a first sequence of commands associated with a first data stream of a first file and a second sequence of commands associated with a second data stream of a second file, and wherein executing the sequence of commands comprises processing the first data stream and the second data stream in parallel.

11. The RoT device of claim 9, wherein causing the cryptography engine to encrypt or decrypt the input data blocks further comprises:

authenticating the input data blocks based on authentication information in the address table.

12. The RoT device of claim 9, wherein the input data blocks comprise ciphertext blocks, wherein the output data blocks comprise plaintext blocks, and wherein processing the input data blocks comprises decrypting the ciphertext blocks to generate the plaintext blocks.

13. The RoT device of claim 9, wherein the input data blocks comprise plaintext blocks, wherein the output data blocks comprise ciphertext blocks, and wherein processing the input data blocks comprises encrypting the plaintext blocks to generate the ciphertext blocks.

14. The RoT device of claim 9, wherein the command table transfer signal comprises an interrupt signal generated by the host device and detected by the RoT device.

15. The RoT device of claim 9, wherein the RoT processor is further configured to assert an interrupt signal detectable by the host device that signals when the DMA engine completes copying the updated command table to the host memory of the host device.

16. A computing system comprising:
a host device having a host memory; and
a root of trust (RoT) device including an RoT memory, a cryptography engine, a direct memory access (DMA) engine, and an RoT processor, the RoT processor configured to execute instructions for performing steps including:
receiving from the host memory of the host device, a command table transfer signal;
responsive to the command table transfer signal, causing the DMA engine to transfer a command table from the host memory to the RoT memory, the command table comprising a sequence of commands for batch execution;
executing the sequence of commands in the command table, wherein executing each command comprises:
causing the DMA engine to copy an address table from the host memory to a DMA memory of the DMA engine, the address table identifying source addresses for input data blocks and destination addresses for output data blocks;
causing the DMA engine to copy the input data blocks identified by the source addresses in the address table from the host memory to the RoT memory;
causing the cryptography engine to encrypt or decrypt the input data blocks to generate the output data blocks in the RoT memory;

causing the DMA engine to copy the output data blocks from the RoT memory to the destination addresses in the host memory; and updating status information associated with the command table in the RoT memory to generate an updated command table; and following execution of the sequence of commands, causing the DMA engine to copy the status information to the host memory of the host device.

17. The computing system of claim 16, wherein the sequence of commands in the command table comprises at least a first sequence of commands associated with a first data stream of a first file and a second sequence of commands associated with a second data stream of a second file, and wherein executing the sequence of commands comprises processing the first data stream and the second data stream in parallel.

18. The computing system of claim 16, wherein causing the cryptography engine to encrypt or decrypt the input data blocks further comprises:

authenticating the input data blocks based on authentication information in the address table.

19. The computing system of claim 16, wherein the input data blocks comprise ciphertext blocks, wherein the output data blocks comprise plaintext blocks, and wherein processing the input data blocks comprises decrypting the ciphertext blocks to generate the plaintext blocks.

20. The computing system of claim 16, wherein the input data blocks comprise plaintext blocks, wherein the output data blocks comprise ciphertext blocks, and wherein processing the input data blocks comprises encrypting the plaintext blocks to generate the ciphertext blocks.

\* \* \* \* \*